United States Patent
Winckler et al.

(10) Patent No.: US 8,220,170 B1
(45) Date of Patent: Jul. 17, 2012

(54) FIRST DOWN INDICATOR SYSTEM

(76) Inventors: Kenneth H. Winckler, Colorado Springs, CO (US); Jason C. Greene, Little River, SC (US)

( * ) Notice: Subject to any disclaimer, the term of this patent is extended or adjusted under 35 U.S.C. 154(b) by 159 days.

(21) Appl. No.: 12/855,761

(22) Filed: Aug. 13, 2010

Related U.S. Application Data

(60) Provisional application No. 61/274,281, filed on Aug. 14, 2009.

(51) Int. Cl.
*A63B 71/06* (2006.01)
*G01B 11/26* (2006.01)
*G01C 15/00* (2006.01)

(52) U.S. Cl. .............. 33/289; 33/DIG. 21; 362/259; 362/431

(58) Field of Classification Search ............. 33/227, 33/263, 286, 289, 293, 294, DIG. 21; 248/230.1, 248/230.4, 230.5, 231.51, 316.5; 362/259, 362/368, 396, 427, 431, 449
See application file for complete search history.

(56) References Cited

U.S. PATENT DOCUMENTS

| | | | |
|---|---|---|---|
| 3,300,861 A * | 1/1967 | Lilly | 33/289 |
| 3,482,317 A | 12/1969 | Truax | |
| 3,741,662 A | 6/1973 | Pioch | |
| 3,752,588 A | 8/1973 | Chapman | |
| 3,848,838 A * | 11/1974 | Thomas | 248/541 |
| 3,985,356 A | 10/1976 | Carlock | |
| 3,985,370 A | 10/1976 | Giorgetti et al. | |
| 4,090,708 A | 5/1978 | McPeak | |
| 4,225,909 A * | 9/1980 | Scholz et al. | 362/367 |
| 4,240,208 A * | 12/1980 | Pehrson | 33/293 |
| 5,067,245 A | 11/1991 | Millard | |
| 5,214,491 A | 5/1993 | Snowden | |
| 5,457,890 A * | 10/1995 | Mooty | 33/294 |
| 5,567,045 A * | 10/1996 | Bucek | 362/363 |
| 5,833,346 A * | 11/1998 | Denley | 362/507 |
| 6,248,989 B1 | 6/2001 | Ohishi | |
| 6,851,198 B1 | 2/2005 | Harty | |
| 6,851,823 B2 * | 2/2005 | Bilotti | 362/102 |
| 6,907,840 B1 * | 6/2005 | Gaines | 116/222 |
| 7,219,438 B2 * | 5/2007 | Amron et al. | 33/289 |
| 7,770,297 B1 * | 8/2010 | Sommerfeld | 33/289 |
| 7,886,450 B1 * | 2/2011 | Fiano | 33/286 |
| 2004/0093748 A1 * | 5/2004 | Watson et al. | 33/286 |
| 2008/0034598 A1 | 2/2008 | Boccardi | |

FOREIGN PATENT DOCUMENTS

| | | |
|---|---|---|
| EP | 1939587 A2 * | 7/2008 |
| JP | 2007064779 A * | 3/2007 |

* cited by examiner

*Primary Examiner* — R. A. Smith
(74) *Attorney, Agent, or Firm* — P. Jeff Martin; The Law Firm of P. Jeffrey Martin, LLC

(57) ABSTRACT

A first down indicator system adapted for removable attachment to a first down marker post of markers of the type used in football games for marking a distance of ten yards to determine first down measurement.

22 Claims, 6 Drawing Sheets

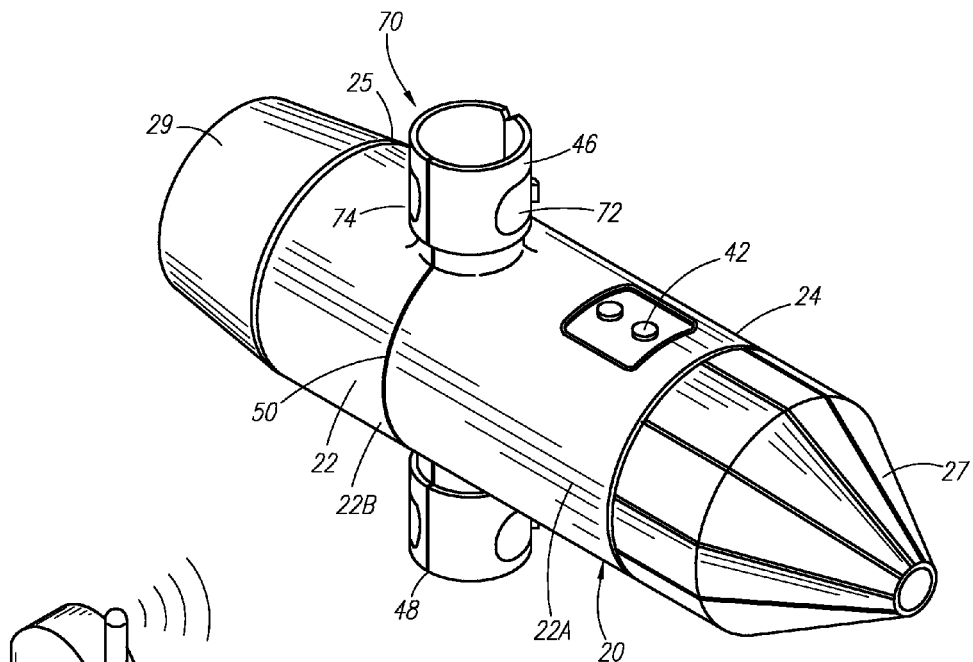
Fig. 1
Fig. 1A
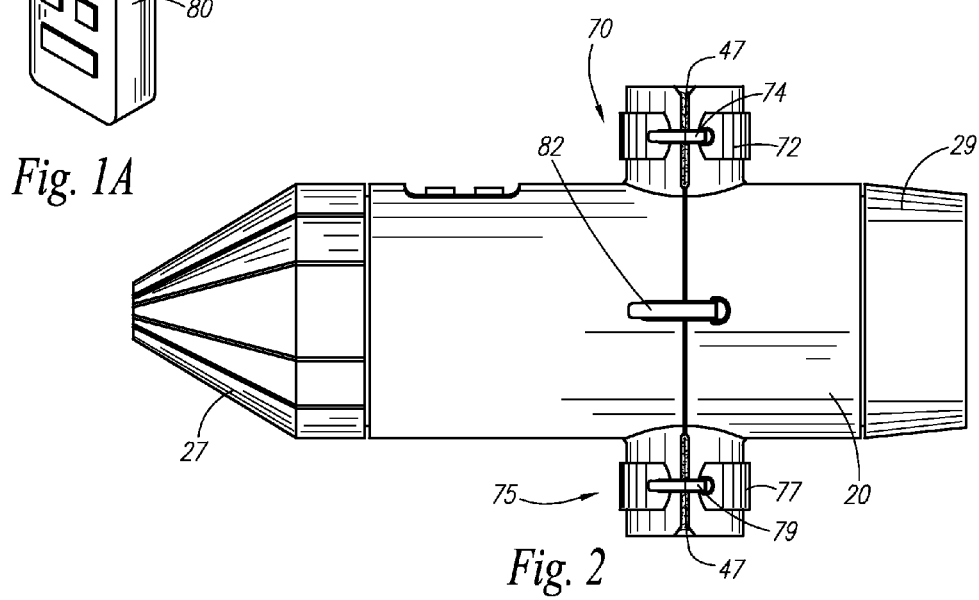
Fig. 2

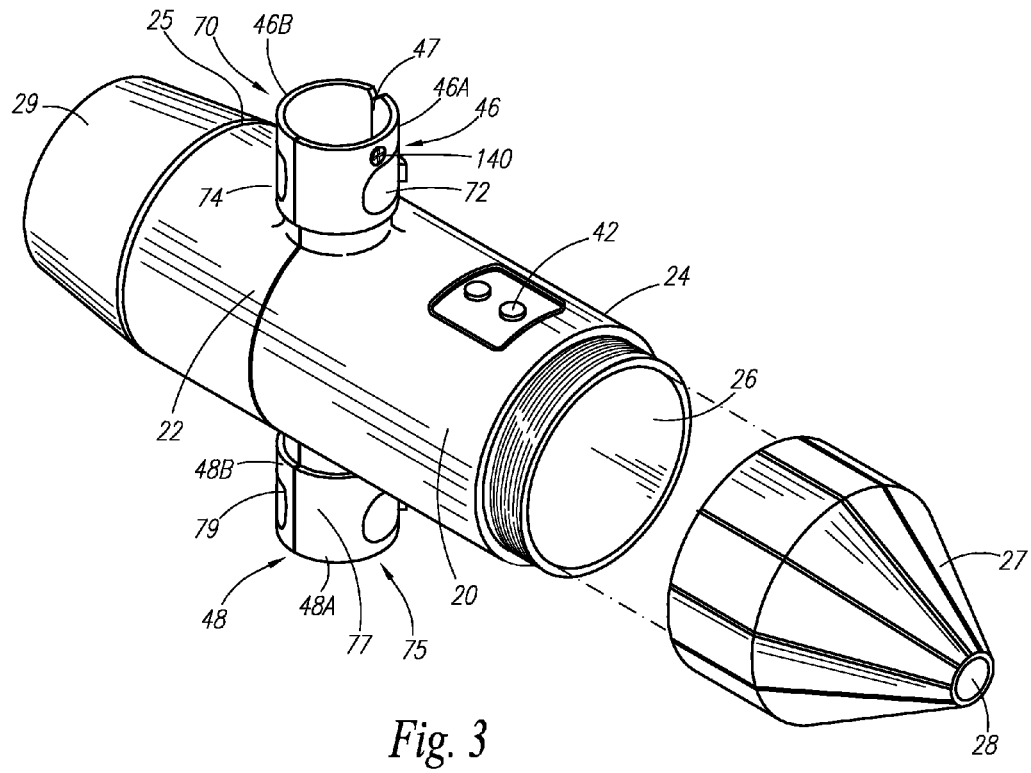
Fig. 3
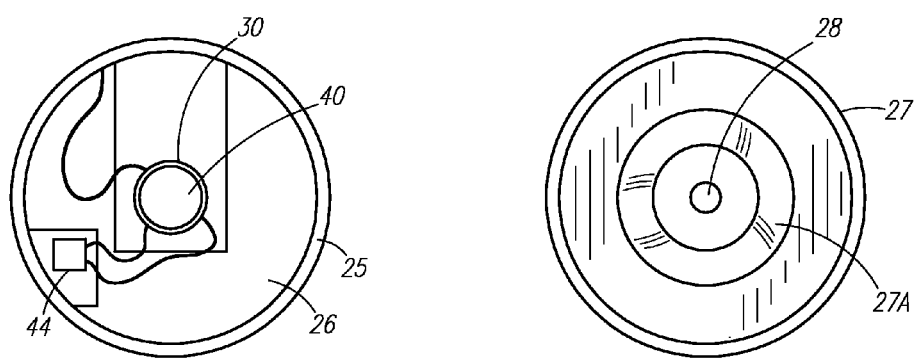
Fig. 4
Fig. 5

FIRST DOWN INDICATOR SYSTEM

RELATED APPLICATIONS

This application claims the benefit of U.S. Provisional Application No. 61/274,281 filed on Aug. 14, 2009.

BACKGROUND OF THE INVENTION

1. Field of the Invention

The present invention relates generally to tracking and positioning systems and, more particularly, to a portable laser system for delineating a predetermined length and for determining whether an object has progressed a predetermined length.

2. Description of the Related Art

Currently there exists in the art various devices and apparatuses for locating, marking, and positioning a football on a football field.

However, the prior art has failed to disclose or teach a first down indicator system comprising a housing specifically designed and configured for accommodating a laser device, wherein such housing comprises a pair of clamp assemblies adapted for allowing housing to be removably secured to a first down marker post in a manner which is quick, easy, and efficient.

Accordingly, a need exists for a laser system having a clamping means to facilitate secured, removable attachment of laser system to a first down marker post. The development of the first down indicator system fulfills this need.

A search of the prior art did not disclose any patents that read directly on the claims of the instant invention; however, the following references were considered related.

U.S. Pat. No. 6,851,198 B1, issued in the name of Harty;
U.S. Patent Application no. 2008/0034598 A1, published in the name of Boccardi;
U.S. Pat. No. 3,752,588, issued in the name of Chapman;
U.S. Pat. No. 3,482,317, issued in the name of Truax;
U.S. Pat. No. 3,741,662, issued in the name of Pioch;
U.S. Pat. No. 3,985,356, issued in the name of Garlock;
U.S. Pat. No. 5,214,491, issued in the name of Snowden;
U.S. Pat. No. 5,067,245, issued in the name of Millard; and
U.S. Pat. No. 4,090,708, issued in the name of McPeak.

Consequently, a need has been felt for a laser system having a clamping means to facilitate secured, removable attachment of laser system to a first down marker post in a manner which is quick, easy, and efficient. This application presents claims and embodiments that fulfill a need or needs not yet satisfied by the products, inventions and methods previously or presently available. In particular, the claims and embodiments disclosed herein describe a first down indicator system comprising a housing specifically designed and configured for accommodating a laser device, wherein such housing comprises a pair of clamp assemblies adapted for allowing housing to be removably secured to a first down marker post, the indicator system providing unanticipated and nonobvious combination of features distinguished from the products, inventions and methods preexisting in the art. The applicant is unaware of any product, method, disclosure or reference that discloses the features of the claims and embodiments disclosed herein.

SUMMARY OF THE INVENTION

Briefly described according to one embodiment of the present invention, a first down indicator system is provided. The indicator system is adapted for removable attachment to a first down marker post of markers used in football games for marking a distance of ten yards for first down measurement. The indicator system comprises a laser housing for housing a laser device. The laser housing includes a main body comprising a first body half and a second body half, the first body half hingedly joined to second body half. The main body defines an open forward end opposing an open rear end, and a hollow inner chamber into which the laser device resides. The open forward end has a forward cap removably coupled thereto, and the open rear end has a rear cap removably coupled thereto. The first body half of housing is secured to the second body half of housing in a closed, snug-fit manner around the first down marker post via a locking mechanism.

The laser device is adapted and configured to emit a laser beam having a wavelength being visible to the human eye and can be seen up to at least 600 feet, wherein the wavelength being in the range of about 325 nm to about 725 nm, and preferably in the range of about 424 nm to about 575 nm. The laser device projects a laser beam via the depression of an activation button. Alternatively, laser device projects a laser beam via a wireless remote device.

The housing includes an upper sleeve and a lower sleeve protruding from an upper surface and lower surface, respectively, thereof. The upper sleeve and lower sleeve each having direct and open fluid passage into the hollow inner chamber of housing.

A first clamp assembly and a second clamp assembly are provided in order to facilitate firm, secured attachment of laser housing to the first down marker post.

According to one embodiment, a pair of gripping recesses are defined along the upper external circumferential surface of the laser housing in order to facilitate grip and manipulation thereof during slidable attachment and detachment of laser housing to and from a first down marker post.

According to one embodiment of the present invention, at least one leveling means may be included in order to maintain the laser device perpendicular with the football field at a 90° angle with the sideline.

According to another embodiment of the present invention, a target may be provided for placement near the football whose position is to be measured. The target ensures the laser device is operating and further delineates whether laser beam is projecting onto an area of the football, such as the tip thereof, or rather onto the target.

According to another embodiment of the present invention, a swivel carriage assembly is disclosed. The swivel carriage assembly comprises a carriage which houses the laser device. The carriage is pivotally mounted inside the laser housing. A control knob is turnable to actuate pivotal adjustment of carriage, and thus in turn, the laser device.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a right side perspective view of the laser housing of a first down indicator system, according to the preferred embodiment of the present invention;

FIG. 1A is perspective view of a wireless remote device for activating a laser device, according to one embodiment of the present invention;

FIG. 2 is a left side perspective view of the laser housing of FIG. 1;

FIG. 3 is a partial exploded perspective view of the laser housing of FIG. 1;

FIG. 4 is a rear end view of the laser housing with second cap removed illustrating the laser device housed within the laser receiving chamber, according to one embodiment of the present invention;

FIG. 5 is a bottom plan view of the first cap showing the abutment element, according to one embodiment of the present invention;

DESCRIPTION OF THE PREFERRED EMBODIMENT

Detailed Description of the Figures

Figure 8:
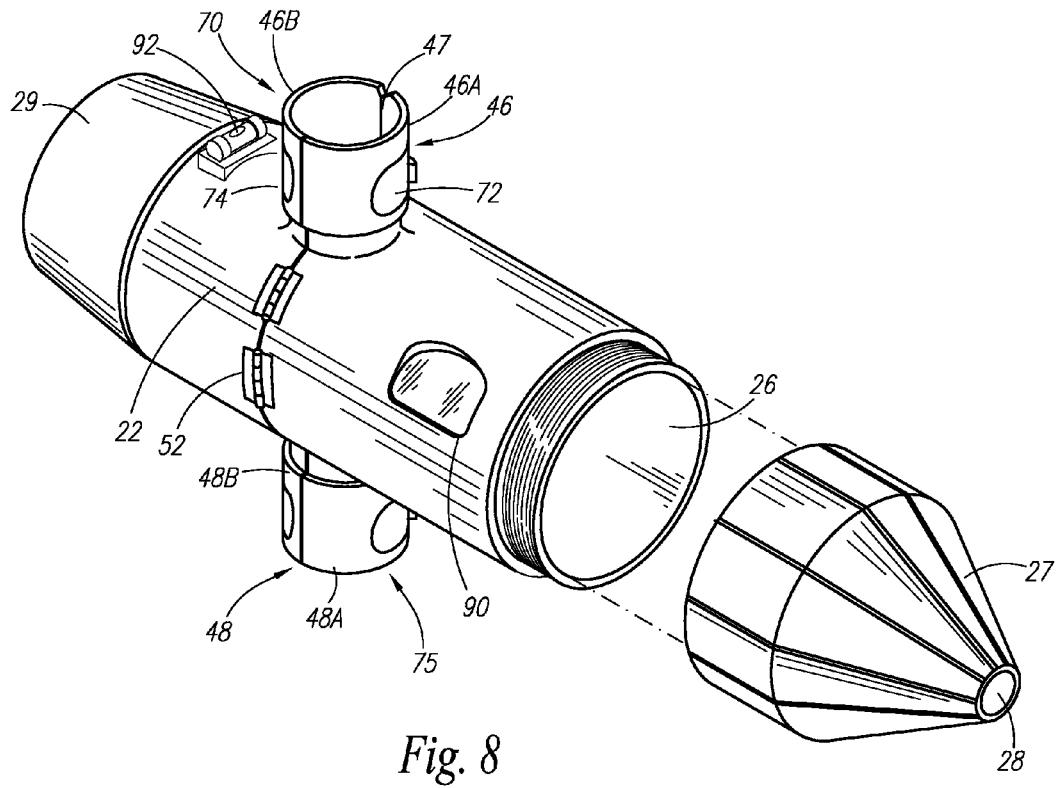
FIG. 8 is a right side perspective view of an alternate embodiment of the present invention.

Referring now to FIGS. 1-5, a first down indicator system is shown, according to one embodiment of the present invention, the first down indicator system, hereinafter referred to as "indicator system 10", is adapted for removable attachment to a first down marker post 60 of markers used in football games for marking a distance of ten yards to facilitate first down measurement. The indicator system 10 comprises at least one laser housing 20 of an elongated, tubular configuration. The housing 20 is constructed of a lightweight, rigid material, such as plastic or plastic polymer, and is therefore capable of injection molding. The housing 20 includes a main body 22 comprising a first body half 22a and a second body half 22b, the first body half 22a hingedly joined to second body half 22b. It is envisioned first body half 22a is hingedly joined to second body half 22b via a flexible or elastic strip of durable material 50, thereby allowing main body 22 to be hinged open to provide access into a hollow inner chamber 26 thereof. It is further envisioned that first body half 22a may be hingedly joined to second body half 22b via a conventional hinge 52, as shown in FIG. 8.

The main body 22 defines an open forward end 24 opposing an open rear end 25, and the hollow inner chamber 26 within which a laser receiving chamber 30 (to be described later in greater detail) is molded integral thereto. The forward end 24 of housing 20 includes a first cap 27 removably coupled thereto. It is envisioned that first cap 27 includes female threads adapted to threadedly engage male threads provided along a portion of the external circumferential surface at the forward end 24 of housing 20, thereby facilitating removable coupling of first cap 27 to forward end 24 of housing 20. The first cap 27 includes a circular aperture 28 defined through the center thereof, wherein aperture 28 being sizably dimensioned so as to allow an emitted laser beam B from a laser device 40 to be emitted therethrough.

The rear end 25 of housing 20 includes a second cap 29 removably coupled thereto. It is envisioned that second cap 29 includes female threads adapted to threadedly engage male threads provided along a portion of the external circumferential surface at the rear end 25 of housing 20, thereby facilitating removable coupling of second cap 29 to rear end 25 of housing 20.

With first cap 27 removed, the forward end 24 provides access to the laser receiving chamber 30 which is molded integral to the first body half 22a. Laser receiving chamber 30 can also be accessed by opening the halves 22a and 22b. The laser receiving chamber 30 is sizably adapted to removably accommodate the laser device 40 in a snug fit manner. First cap 27 may include at least one abutment element 27a molded or otherwise suitably attached to the inner surface thereof so as to provide an abutment against which a forward end of laser device 40 contacts, thereby immobilizing laser device 40 during use or operation of the present invention.

The laser device 40 is adapted and configured to emit a laser beam B having a wavelength being visible to the human eye and can be seen up to at least 600 feet, wherein the wavelength being in the range of about 325 nm to about 725 nm, and preferably in the range of about 424 nm to about 575 nm. The laser device 40 is activated, or projects a laser beam B, via the depression of an activation button 42 being operatively connected thereto. The activation button 42 may be positioned in an easily accessible position atop the upper surface of housing 20. Alternatively, laser device 40 is activated, or projects a laser beam B via a wireless remote device 80. The wireless remote device 80 is in operative communication with laser device 40 to facilitate activation thereof. Laser device 40 is powered via a power source 44, such as at least one rechargeable battery, housed within a rear cavity of the laser device 40, or housed within a cavity(ies) molded integral to the laser receiving chamber 30, proximal to the lower end of laser device 40.

The design and configuration of the housing 20 affords important functional utility to the present invention, providing unanticipated and nonobvious combination of elements and features which will be described hereinbelow.

Figure 6:
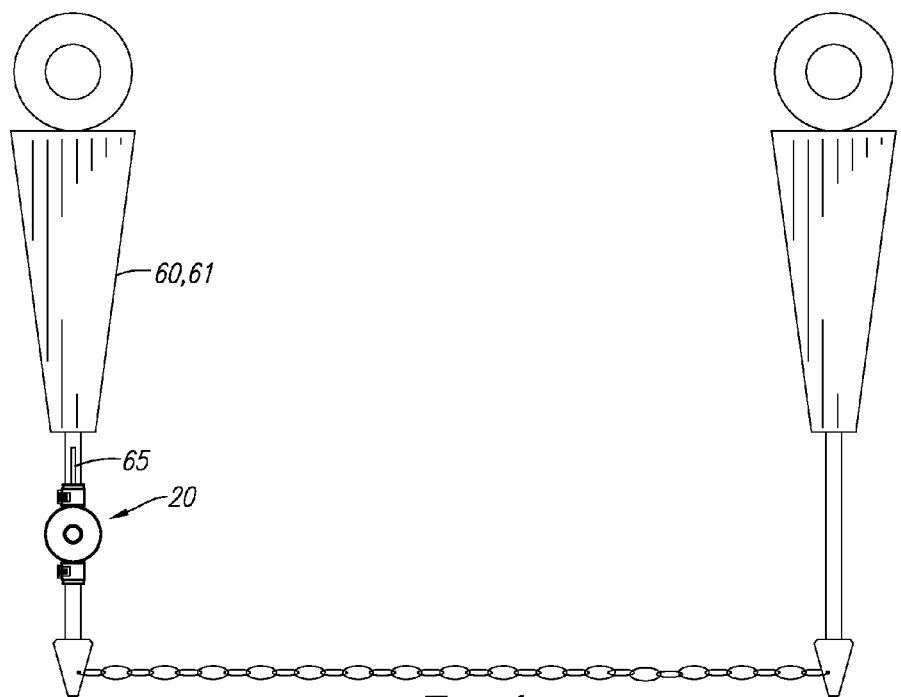
FIG. 6 is a side elevational view of the laser housing shown removably attached to a forward first down marker post; according to one embodiment of the present invention.

Referring now more specifically to FIGS. 1, 2, and 6, an upper surface of the housing 20, proximal the rear end 25 thereof, includes an upper sleeve 46 protruding upwardly therefrom. The upper sleeve 46 includes an open top providing direct and open fluid passage into the hollow inner chamber 26 of housing 20. The upper sleeve 46 comprises a first sleeve half 46a and a second sleeve half 46b, the first sleeve half 46a may be hingedly joined to and second sleeve half 46b via the flexible or elastic strip of durable material 50. The first sleeve half 46a or the second sleeve half 46b may include a thin, pliable membrane 47 disposed longitudinally to the fillet thereof, thereby forming an air-tight, moisture impermeable seal upon closed engagement by the first sleeve half 46a with the second sleeve half 46b.

The lower surface of the housing 20, proximal the rear end 25 thereof and linearly aligned with upper sleeve 46, includes a lower sleeve 48 protruding downwardly therefrom. The lower sleeve 48 includes an open bottom providing direct and open fluid passage into the hollow inner chamber 26 of housing 20. The lower sleeve 48 comprises a first sleeve half 48a and a second sleeve half 48b, the first sleeve half 48a may be hingedly joined to second sleeve half 48b via the flexible or elastic strip of durable material 50. The first sleeve half 48a or the second sleeve half 48b may include a thin, pliable membrane 47 disposed longitudinally to the fillet thereof, thereby forming an air-tight, moisture impermeable seal upon closed engagement by the first sleeve half 48a with the second sleeve half 48b. The upper sleeve 46 and lower sleeve 48 each define a diameter sized to slidably receive a first down marker post 60 in a snug-fit manner. The first down marker post 60 is shown inserted through housing 20 in FIG. 6. To attach housing 20 to post 60, housing 20 is hinged open and closed snugly around post 60. A locking mechanism 82, mounted to the second body half 22b of housing 20, secures the first body half 22a to the second body half 22b in a closed, snug-fit manner around post 60. The post 60 extends through the upper sleeve 46, through the hollow inner chamber 26 of housing 20, and through the lower sleeve 48.

Figure 6A:
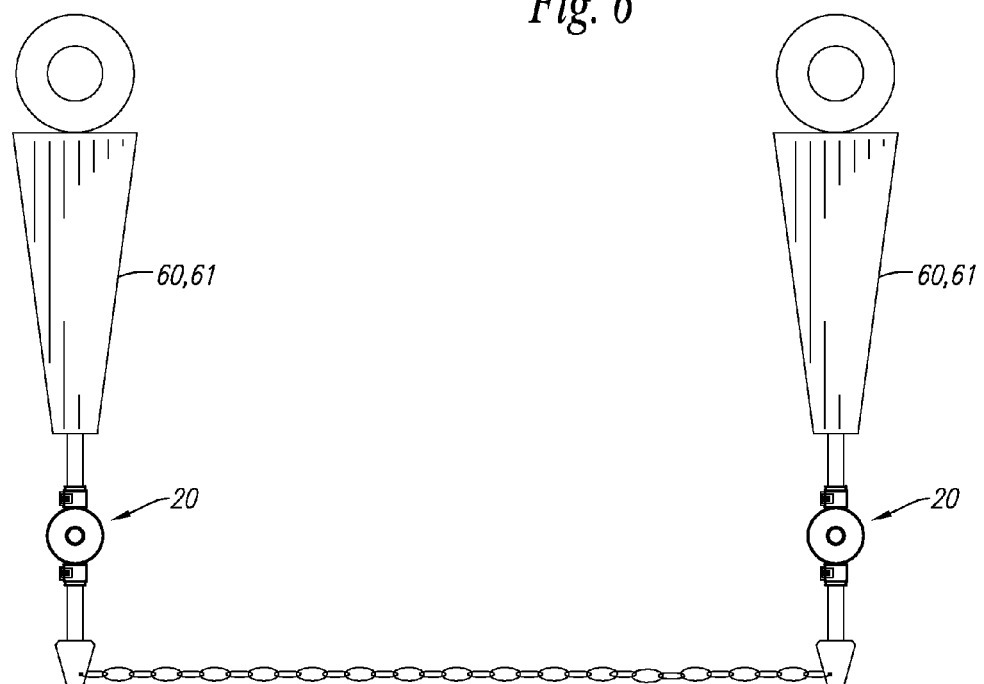
FIG. 6A illustrates two laser housings removably attached to two first down marker posts.

FIG. 6A illustrates two laser housings 20 removably attached in series to two first down marker posts 60, respectively. Attaching a laser housing 20 to each post 60 eliminates the need for a game official to rotate the indicator posts 60 when football possession is gained by an opposing team. Thus, the use of two laser housings 20 limit movement by posts 60 to a longitudinal direction as measured between end zone to end zone.

Figure 6B:
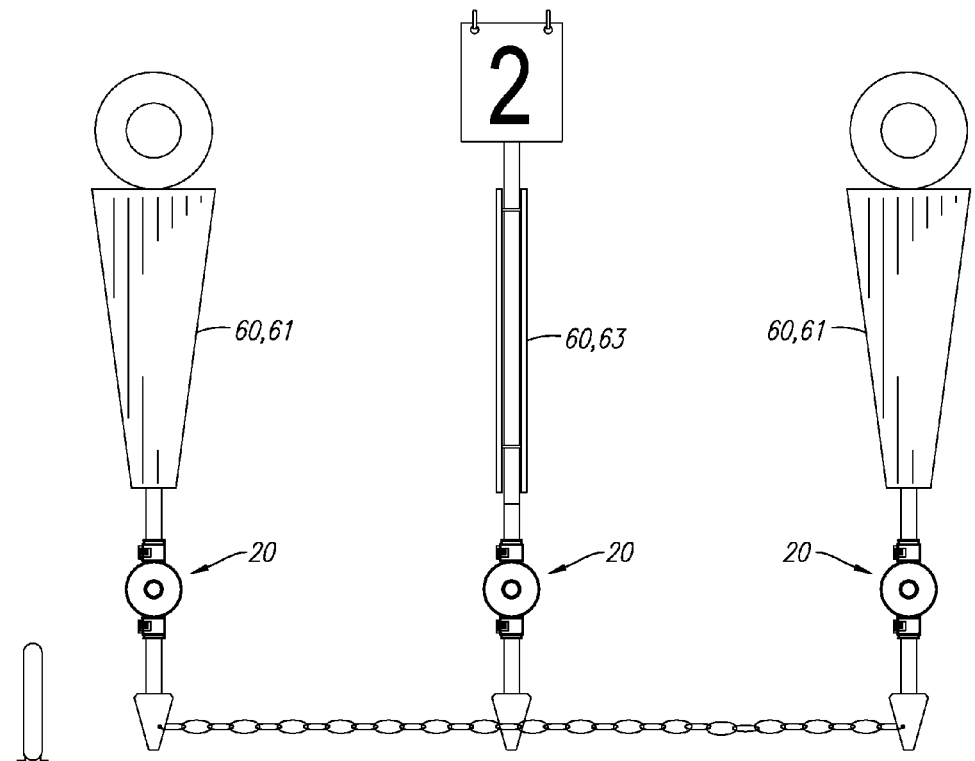
FIG. 6B illustrates three laser housings removably attached to three first down marker posts.

FIG. 6B illustrates three laser housings 20 removably attached to three first down marker posts 60, respectively. The medial indicator post 63 with attached laser housing 20 allows for the precise placement or "spotting" of a football by a football spotting official subsequent to each football play.

In order to facilitate firm, secured attachment of the main body 22 to post 60, a first clamp assembly 70 and a second clamp assembly 75 are provided. The first clamp assembly 70 comprises a clamp mounting plate 72 mounted to the outer sidewall of the upper sleeve 46. An adjustable clamp member 74 is mounted to the clamp mounting plate 72. The second clamp assembly 75 comprises a clamp mounting plate 77 mounted to the outer sidewall of the lower sleeve 48. An adjustable clamp member 79 is mounted to the clamp mounting plate 77. The laser housing 20 is longitudinally adjustable about the post 60 and is securably attached thereto along a selected longitudinal position via the first and second clamp assembly 70, 75. Thus, the laser housing 20 is slidable along the longitudinal axis of post 60 to compensate for football fields having a slope or crown 132 of varying degrees or sizes.

Referring now to FIG. 8, according to an exemplary embodiment of the present invention, a pair of gripping recesses 90 (only one gripping recess illustrated) is defined along the upper external circumferential surface of housing 20 in order to facilitate grip and manipulation thereof during slidable attachment and detachment of housing 20 to and from a first down marker post 60. While two gripping recesses 90 are disclosed, only one grip recess 90 is shown in FIG. 8.

According to one embodiment of the present invention, at least one leveling means 92 may be included in order to maintain the laser device 40 perpendicular with the football field 130 at a 90° angle with respect to the sideline thereof, thereby ensuring laser beam B is projected from laser device 40 at an angle measuring 90°, where laser beam B is defined as the x-axis and football field 130 sideline is defined as the y-axis. The leveling means 92 may include, but is not limited to a pendulum, a bubble level, or an electronic leveling means adapted with an auditory emitter or other indicator means to indicate laser device 40 is level.

Figure 7:
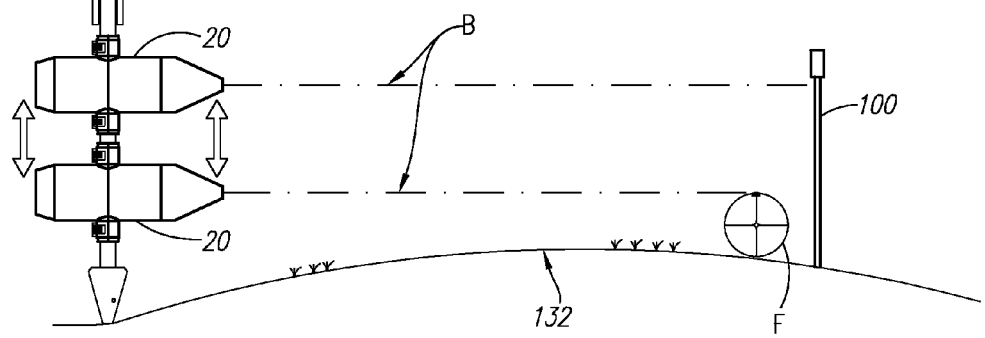
FIG. 7 is a side elevational view of the laser housing illustrating the adjustability thereof along the longitudinal axis of a forward first down marker post.

Referring to FIG. 7, according to another embodiment of the present invention, a target 100 may be provided for placement near the football F whose position is to be measured. The laser device 40 projects an image or mark onto the target 100 which is easily detected by an image/mark detector, an optical device, or observer. The target 100 ensures laser device 40 is operating and further delineates whether beam B is projecting onto an area of the football F, such as the tip thereof, or rather onto the target 100.

Figure 9:
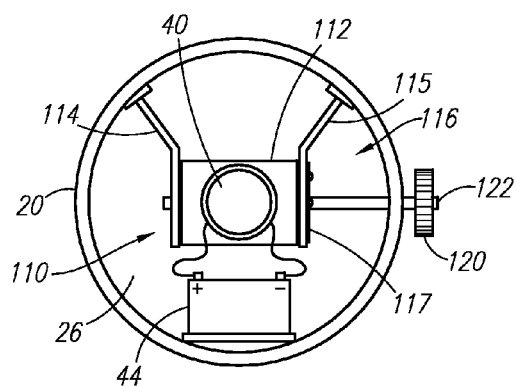
FIG. 9 is a rear end view of a laser housing with second cap removed illustrating another embodiment of the present invention.

Referring to FIG. 9, according to another embodiment of the present invention, a swivel carriage assembly 110 is disclosed. The swivel carriage assembly 110 comprises a carriage 112 which houses the laser device 40 inside the hollow inner chamber 26 of housing 20. Carriage 112 is pivotally mounted via a pair of brackets 114,115 to an inner sidewall of the housing 20. An adjustment mechanism 116, comprising an adjustment plate 117, is coupled to one of the brackets 114, 115. The adjustment mechanism 116 allows for selective pivoting of carriage 112, and in turn, laser device 40, to a desired, fixed rotational position. The adjustment plate 117 includes a plurality of spaced holes defined therein through which a spring-biased detent or pin extending from a sidewall of carriage 112 engages so as to maintain carriage 112 in fixed position. Adjustment mechanism 116 further comprises a control knob 120 being in direct connection with carriage 112. The control knob 120 is turnable to actuate pivotal adjustment of carriage 112, and thus in turn, laser device 40. It is envisioned control knob 120 includes a depressible button 122, whereupon depression thereof causes retraction of detent or pin away from adjustment plate 117, and whereupon release of depressible button 122 allows detent to be biased toward adjustment plate 117 and into a respective hole therein.

According to yet another embodiment of the present invention, the first sleeve half 46a of the upper sleeve 46 may include an aperture defined therethrough for receiving a fastener 140 (FIG. 3), such as a screw. The fastener 140 having a lower end which slidably engages a longitudinal groove 65 (FIG. 6B) formed in an external circumferential sidewall of the first down marker post 60. The fastener 140 is tightened, thereby enabling the laser device 40 to maintain a 90° orientation with respect to the football field 130 sideline.

Figure 10:
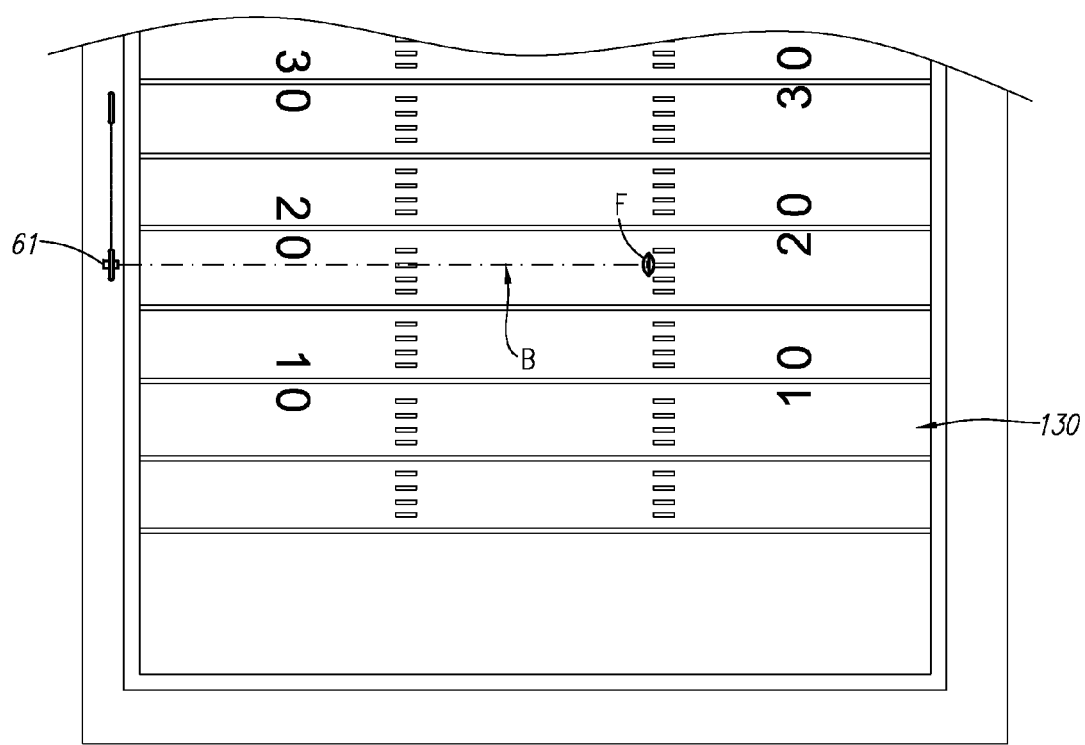
FIG. 10 is a top plan view of the laser device emitting a laser beam across a football field and onto a football, according to one embodiment of the present invention.

Finally, referring now to FIGS. 1-3, 6, and more particularly to FIGS. 7 and 10, during use of the indicator system 10, the housing 20 is adjustably attached to the forward first down marker post 61. The forward first down marker post 61 is maintained at a right angle with respect to the football field 130. The housing 20 is adjustably attached to the forward first down marker post 61 such that the beam B emitted from the laser device 40 is capable of projecting across the football field 130 to the far sideline from where the forward first down marker post 61 is located. The laser beam B is projected over the football field 130. The trajectory of the emitted beam B perpendicularly intersects the far sideline demarcation line. The first down distance as projected by the laser device notifies the image detector if the football F has traveled the required distance necessary for obtaining a first down. The position of the football F in relation to the laser beam B mark is readily apparent and is perceivable by the image detector, particularly, when the laser beam B is projecting on the football F.

The use of the present invention provides a quick, easy, and efficient means for removably attaching a laser device to a first down marker post.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A first down indicator system, the system comprising:
   at least one laser housing, the at least one laser housing being removably attachable to a respective first down marker post in a firm, secured manner, the at least one laser housing includes a main body defining an open forward end opposing an open rear end, and a hollow inner chamber, the at least one housing having a laser receiving chamber molded integral to the at least one housing inside the hollow inner chamber thereof;
   a laser device, the laser device is removably positioned in the laser receiving chamber in a snug fit manner;
   a laser activation means; and
   a pair of clamp assemblies, the pair of clamp assemblies are adapted to facilitate firm, secured attachment of the at least one laser housing to a first down marker post,
   wherein the main body comprises a first body half and a second body half, the first body half is hingedly joined to the second body half.

2. The first down indicator system of claim 1, wherein the laser device emits a laser beam having a wavelength being visible to a human eye and can be seen up to at least 600 feet.

3. The first down indicator system of claim 2, wherein the wavelength is in the range of about 325 nm to about 725 nm.

4. The first down indicator system of claim 2, wherein the laser device is activated via depression of an activation button.

5. The first down indicator system of claim 2, wherein the laser device is activated via a wireless remote device.

6. The first down indicator system of claim 1, wherein the at least one laser housing has an upper surface from which an upper sleeve protrudes upwardly therefrom, the upper sleeve includes an open top providing direct and open fluid passage into the hollow inner chamber.

7. The first down indicator system of claim 6, wherein the upper sleeve comprises a first sleeve half and a second sleeve half, the first sleeve half is hingedly joined to the second sleeve half.

8. The first down indicator system of claim 7, wherein the first sleeve half or the second sleeve half includes a thin, pliable membrane disposed longitudinally to a fillet thereof, thereby forming an air-tight, moisture impermeable seal upon engagement by the first sleeve half with the second sleeve half.

9. The first down indicator system of claim 7, wherein the first sleeve half of the upper sleeve includes a fastener for engaging an aperture defined through the first sleeve half, the fastener slidably engages a longitudinal groove formed in an external circumferential sidewall of the first down marker post, and whereupon tightening of the fastener enables the laser device to maintain a 90° orientation with respect to a football field sideline.

10. The first down indicator system of claim 6, wherein the upper sleeve defines a diameter sized to slidably receive a first down marker post in a snug-fit manner.

11. The first down indicator system of claim 1, wherein the at least one laser housing has a lower surface from which a lower sleeve protrudes downwardly therefrom, the lower sleeve includes an open bottom providing direct and open fluid passage into the hollow inner chamber.

12. The first down indicator system of claim 11, wherein the lower sleeve comprises a first sleeve half and a second sleeve half, the first sleeve half is hingedly joined to the second sleeve half.

13. The first down indicator system of claim 12, wherein the first sleeve half or the second sleeve half includes a thin, pliable membrane disposed longitudinally to a fillet thereof, thereby forming an air-tight, moisture impermeable seal upon engagement by the first sleeve half with the second sleeve half.

14. The first down indicator system of claim 11, wherein the lower sleeve defines a diameter sized to slidably receive a first down marker post in a snug-fit manner.

15. The first down indicator system of claim 1, wherein the first body half is secured to the second body half in a closed, snug-fit manner around the first down marker post via a locking mechanism.

16. The first down indicator system of claim 1, wherein the at least one laser housing is longitudinally adjustable about the first down marker post and is securably attached circumferentially therearound, along a selected longitudinal position, via the pair of clamp assemblies.

17. The first down indicator system of claim 1, wherein the open forward end of the at least one housing includes a first cap removably coupled thereto, the first cap includes a circular aperture defined through a center thereof, wherein the circular aperture is sizably dimensioned so as to allow an emitted laser beam from the laser device to be projected therethrough, and wherein the open rear end of the at least one housing includes a second cap removably coupled thereto.

18. The first down indicator system of claim 1, further comprising at least one leveling means to enable the laser device to maintain a 90° orientation with respect to a football field sideline.

19. The first down indicator system of claim 1, further comprising a target onto which a laser beam is projected from the laser device to enable operator to ensure the laser device is operating and functioning properly.

20. A first down indicator system, the system comprising:
   at least one laser housing, the at least one laser housing being removably attachable to a respective first down marker post in a firm, secured manner, the at least one laser housing includes a main body defining an open forward end opposing an open rear end, and a hollow inner chamber, the at least one housing having a laser receiving chamber molded integral to the at least one housing inside the hollow inner chamber thereof;
   a laser device, the laser device is removably positioned in the laser receiving chamber in a snug fit manner;
   a laser activation means;

a pair of clamp assemblies, the pair of clamp assemblies are adapted to facilitate firm, secured attachment of the at least one laser housing to a first down marker post; and a swivel carriage assembly comprising:

a carriage housing the laser device inside the hollow inner chamber of the at least one housing, the carriage is pivotally mounted via a pair of brackets to an inner sidewall of the at least one housing; and an adjustment mechanism comprising an adjustment plate, the adjustment plate is coupled to one of the pair of brackets, the adjustment mechanism allows for selective pivoting of the carriage, and in turn, the laser device.

21. The first down indicator system of claim 20, wherein the adjustment mechanism further comprises a control knob for actuating pivotal adjustment of the carriage, and thus in turn, the laser device.

22. The first down indicator system of claim 20, wherein the system further comprises a fastener for engaging an aperture defined through the main body, the fastener slidably engages a longitudinal groove formed in an external circumferential sidewall of the first down marker post, and whereupon tightening of the fastener enables the laser device to maintain a 90° orientation with respect to a football field sideline.

\* \* \* \* \*